United States Patent Office

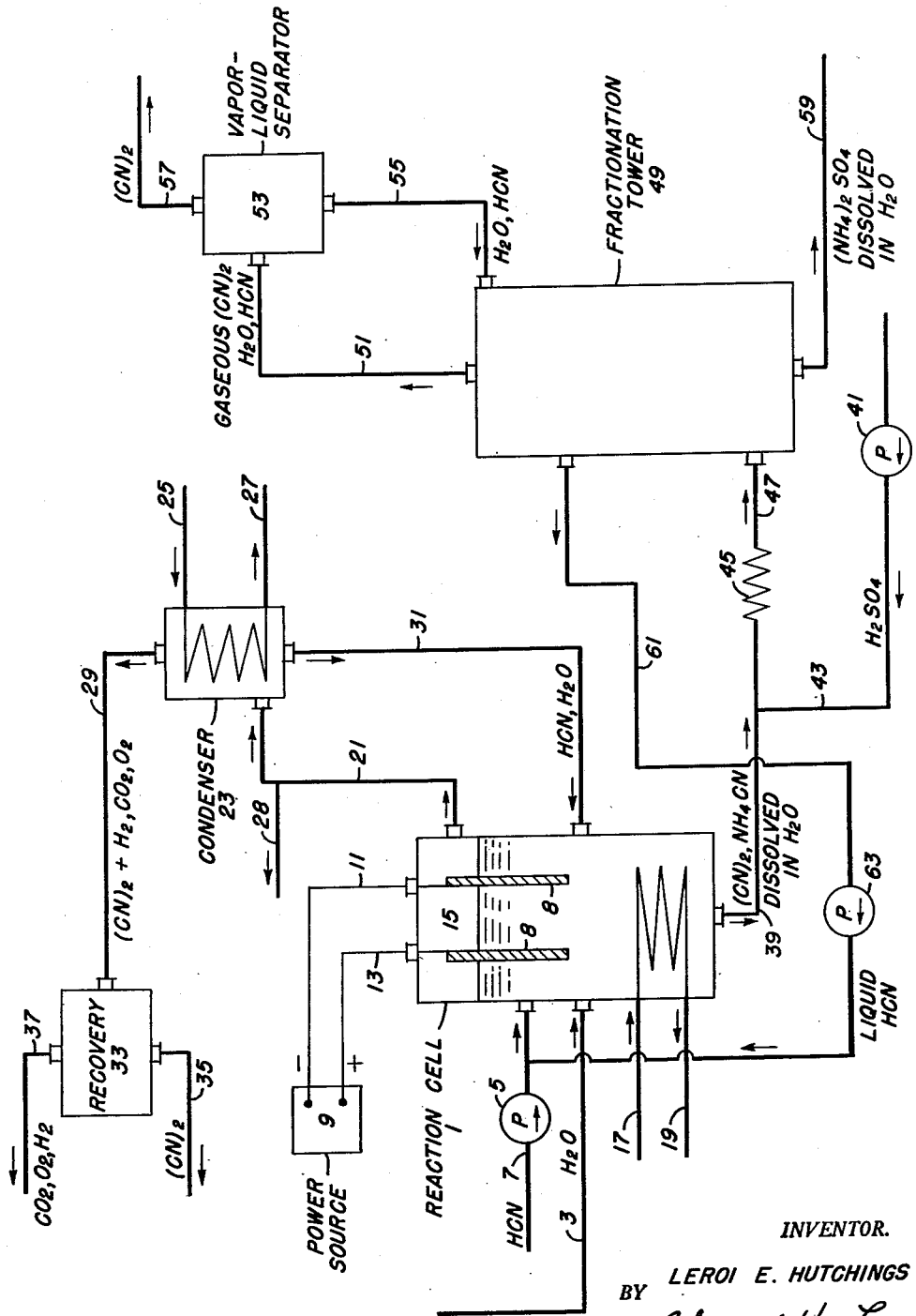

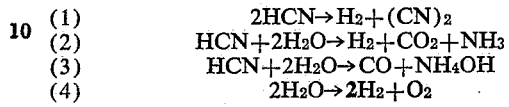

2,793,991
Patented May 28, 1957

2,793,991

PRODUCTION OF CYANOGEN

Le Roi E. Hutchings, Crystal Lake, Ill., assignor to The Pure Oil Company, Chicago, Ill., a corporation of Ohio Application August 1, 1955, Serial No. 525,476

15 Claims. (Cl. 204—101)

This invention relates to the preparation of cyanogen.

More particularly, this invention relates to a process for the conversion of hydrogen cyanide or hydrocyanic acid into cyanogen through the use of an electric current.

Cyanogen, also known as ethane dinitrile, dicyanogen and oxalonitrile, is a colorless, extremely toxic gas of high stability having utility in a number of chemical syntheses and other chemical reactions, notably in the preparation of nitriles. It also finds commercial use as a fumigant due to its above-mentioned toxicity. It was discovered by Gay-Lussac in 1815, but has not in the past been manufactured on a large scale and has not found wide usage, despite its valuable properties, because the methods available for its preparation are relatively few and expensive.

Cyanogen has been prepared in the past by dehydration of ammonium oxalate or oxamide with phosphorus pentoxide; by the treatment of sodium cyanide or potassium cyanide with copper sulfate; by heating mercuric cyanide, silver cyanide or auric cyanide; and by the dehydration of glyoxime with acetic anhydride. A newer method of producing cyanogen comprises reacting hydrogen cyanide with chlorine gas, hydrogen chloride and cyanogen being evolved. Elevated temperatures of about 200–1000° C. are necessary for this reaction. Still another process is known, which is characterized by the use of an electric current. In this latter method, cyanogen is synthesized by passing an electric discharge between carbon electrodes in an atmosphere of nitrogen. The reaction is endothermic and requires temperatures above 200° F. to obtain a practical yield. The prior art also indicates that this method can be conducted successfully under conditions of very high current densities and fairly low pressures, but under these conditions, yields are small. All of the prior art methods are characterized by being fairly complex and/or involving special operating conditions of temperature and/or pressure.

An object of this invention is to provide a new and improved process for the production of cyanogen. A further object is to provide a process whereby cyanogen is economically prepared from hydrogen cyanide. A still further object is to provide a process for the preparation of cyanogen from hydrocyanic acid by means of an electric current. Still another object is to provide a simple, inexpensive and efficient method of preparing cyanogen which comprises decomposing hydrocyanic acid or hydrogen cyanide by means of an electric current without substantial concomitant production of deleterious side-products. A still further object of this invention is to produce cyanogen economically, without the necessity of resorting to substantially increased or decreased temperatures and/or pressures, by means of the electrolytic decomposition of hydrocyanic acid or hydrogen cyanide.

The accompanying drawing is a schematic or diagrammatic illustration of apparatus suitable for carrying out my invention.

I have found that when an electrolytically conducting solution of hydrogen cyanide, such as hydrogen cyanide in water (which forms hydrocyanic acid) is electrolyzed by the passage of current therethrough between a non-corrodible metal anode, that is, an anode relatively resistant to attack by reactants or products of reaction, and a carbon or graphite cathode, cyanogen is produced. The reactions involved are believed to be the following:

(1) $2HCN \rightarrow H_2 + (CN)_2$
(2) $HCN + 2H_2O \rightarrow H_2 + CO_2 + NH_3$
(3) $HCN + 2H_2O \rightarrow CO + NH_4OH$
(4) $2H_2O \rightarrow 2H_2 + O_2$ My process can be commercially applied to the recovery of valuable cyanogen. It should be noted that a particularly advantageous feature exists in the use of electrodes comprising a substantially attack-resistant metal electrode and an electrode comprising a carbonaceous material or the same metal as the other electrode. Usually the metal serves as the anode where metal and carbonaceous electrodes are used. As will be more particularly pointed out below, two carbon electrodes are not as effective in the process, the desired product, cyanogen, not being obtained in as large a quantity, but two different metal electrodes may be employed as long as neither is attacked.

My process employs hydrogen cyanide as the principal feed. Hydrogen cyanide, otherwise known as prussic acid or formonitrile, is a colorless gas, very poisonous and of almond-like odor. Hydrogen cyanide utilized in my process is preferably of relatively pure form, so that contamination of the desired product with products of side-reactions involving the impurities may be avoided. The hydrogen cyanide may, for example, be obtained from a complex salt such as potassium ferrocyanide by reaction with sulfuric acid. On a commercial basis, hydrogen cyanide is usually prepared by heating beet-sugar molasses, recovering trimethylamine vapors, and decomposing the trimethylamine by passing it in a vapor form through retorts heated to 800–1000° C. Resulting hydrogen cyanide is then separated from the methane.

While it is possible to use in my process hydrogen cyanide alone, that is, without the assistance of a solvent, I prefer to place the hydrogen cyanide in a solvent, water being the solvent of choice because of its high solubility for hydrogen cyanide, cheapness, and availability. The hydrogen cyanide in water solution ionizes to form hydrocyanic acid and an electrical current may easily be passed therethrough. An additional advantage from the employment of hydrogen cyanide in water solution is that danger of poisoning is not as great as when hydrogen cyanide alone is employed.

The amount or concentration of hydrogen cyanide dissolved in a liquid medium, preferably water, depends on the particular operating conditions and may vary within a wide range. In general, however, relatively high concentrations of hydrogen cyanide are conducive to improved yields per unit time. A ratio of hydrogen cyanide to distilled water may, for example, be 1:2–4, although other concentrations, limited only by the solubility of hydrogen cyanide in water, may be utilized. Liquid sulfur dioxide may be used as a solvent, but it possesses limited solvency at low temperatures, and the electrolysis must be conducted under conditions of elevated pressure and higher temperature.

The electrodes utilized in my process are preferably of the platinum wire-screen (anode) and carbon (cathode) type, although other attack-resistant metal anodes may be used, such as gold, nickel, or chrome alloys and graphite or carbon may also be used. Also, the cathode may be graphite or an attack-resistant metal such as platinum, gold, nickel or chrome alloy, the same as or different from the anode. Both electrodes may be metals. The anode preferably is not carbon or graphite where a metal is utilized as the cathode. The anode should not be carbon or graphite where the cathode is carbon or graphite. A complete carbon or graphite or carbon-graphite electrode system (i. e., both anode and cathode being carbon or graphite or one of each) is not satisfactory for use because the formation of paracyanogen is promoted when hydrogen cyanide in water solution is electrolyzed between two carbon electrodes. Paracyanogen, of formula $(CN)_x$ is an undesirable product existing as a brown, amorphous powder which sublimes on heating. Paracyanogen is not readily dissociated to cyanogen and, when formed during electrolysis, tends to cling to the electrode, thereby stopping or substantially retarding the progress of the electrolysis. Substantial production of paracyanogen during electrolysis is therefore to be avoided, but this is not possible if a carbon-carbon electrode system is employed in my process. Non-limiting examples of suitable anode-cathode electrode systems utilizable in my process are the following: platinum-graphite, platinum-platinum, nickel-graphite, nickel-nickel, platinum-nickel, etc. These electrodes are commercially available and may be of any suitable shape or size. If water is used as the solvent medium, distilled water is preferred in order to reduce side reactions and contamination of product.

My process is preferably, but not necessarily, run at the boiling point of the reaction mixture. Most preferably, enough current is passed through the system to promote and maintain vigorous boiling during the electrolysis. Thus, if liquid hydrogen cyanide is utilized alone, the preferred temperature is the boiling point of hydrogen cyanide, that is about 26° C. at normal atmospheric pressure. If hydrogen cyanide is employed dissolved in water, then the boiling point will vary according to the concentration of the dissolved hydrogen cyanide and any dissolved reaction products or contaminants in the water and, of course, the pressure to which the system is subjected.

By operating my process at the boiling point of the reaction mixture, the reaction rate is accelerated, so that a higher yield is obtained per unit time than with lower temperatures. Moreover, the constant evolution of gases during the reaction continuously sweeps the electrodes clean of any reaction products which may tend to cling around the electrodes and block or impede the reaction.

Ambient temperatures of 0° to 25° C. and atmospheric pressure are, however, also suitable for use in my process when hydrogen cyanide is utilized alone, and temperatures below the boiling point of the reaction mixture and above the freezing point may be used when the hydrogen cyanide is present in water solution. Thus, 15 to 25° C. is a temperature range within which my process operates satisfactorily.

The voltage impressed across the electrodes may vary according to the conducting medium present and its coefficient of conductivity. At least some current must pass between the two electrodes to bring about the desired reactions. In the case of water as the solvent medium, an electromotive force of less than 10 volts may be sufficient, although voltages higher than 40 have also been used successfully. The distance between electrodes depends on the type of electrodes, their size and shape, the solvent medium present, and the voltage to be impressed across the electrodes. With platinum (anode)-carbon (cathode) electrodes and water, a gap of one-thirty-second to one-half inch is satisfactory. The electrodes may be arranged in any suitable position relative to each other and to the walls of the reaction cell, and may be of any suitable shape. Thus, for example, instead of being of the vertically elongated rod type, the electrodes may be of the flat-plate type or in the form of perforated grids. Other shapes are also contemplated, and both electrodes need not be of the same shape. The electrodes may be arranged one above the other, that is, horizontally extended, side by side, that is, vertically extended, or at any angle or angles from the horizontal or vertical planes. Preferably, the electrodes are arranged so that they are efficiently and continuously swept by most of the gases evolving from the boiling reaction mixture during operation of my process. Thus, as a non-limiting example, two platinum wire electrodes may be employed opposite and parallel to each other in the reaction vessel and spaced closely enough so that the gases evolving from each screen sweep across the face of the opposed screen as well as the one from which they evolve.

Amperage and wattage also may vary widely; for example, from 0.70 to 1.0 amp., and up to 10 watts. These conditions vary according to the individual requirements for modifications of my process; for example, the distance between electrodes somewhat determines the voltage necessary to be impressed on the system and the area of the electrodes determines the wattage. The above ranges of concentrations, volts, amperages, and watts are not to be construed as limitations, since other efficacious values may be used in my process.

Referring now to the accompanying drawing, water enters reaction cell 1 through line 3 and mixes with hydrogen cyanide introduced to reaction cell 1 through pump 5 and line 7. Alternatively, a solution of hydrogen cyanide already dissolved in water to a desired concentration, such as, for example, 1 volume of hydrogen cyanide in 3 volumes of distilled water, may be passed to reaction cell 1 from line 3 or 7. Reaction cell 1 is of any suitable shape, size and construction, and is equipped with an anode and a cathode of the above-described types. On application of an E. M. F., which may be, for example, 20 volts D. C. across electrodes 8 from power source 9 through connecting wires 11 and 13, electrolysis of the hydrogen cyanide occurs. Hydrogen, oxygen, ammonia, carbon dioxide, and carbon monoxide, as well as cyanogen may form in the process due to the electrolysis of a small amount of a carbon cathode and the hydrolysis of hydrogen cyanide. Carbon dioxide, hydrogen, oxygen, and cyanogen evolve as gases and pass into space 15 above the electrolytic solution. The rate of electrolysis depends to some extent on the temperature of the system, as regulated by a heat-transfer medium, such as water, circulating through the coil in reaction vessel 1, the coil being supplied through lines 17 and 19.

Product gases, contaminants, steam and unconverted hydrogen cyanide pass out of space 15 through line 21 to condenser 23, which is supplied with cold water or other heat-regulating medium through the coil fed by lines 25 and 27. Line 28 may be used for withdrawing reaction affluent from line 21 to vent or for other purposes. Product gases and contaminants pass through condenser 23 and out of the condenser through line 29, which condensed steam and hydrogen cyanide pass out through line 31 by gravity flow back to reaction cell 1. The uncondensed gases in line 29 pass to recovery means 33, which may be any suitable arrangement, such as a fractional condensation tower. Cyanogen condenses therein, and is removed through line 35, while the lower boiling components including hydrogen, oxygen, and carbon dioxide, are removed as effluent through line 37. The take-off of gases through line 21 and return of unreacted hydrogen cyanide through line 31 are continuous as the electrolysis proceeds. The returning, aqueous hydrocyanic acid entering vessel 1 from line 31 serves to set up circulation around the electrodes and tends to wash said electrodes of products formed thereon and adhering thereto. A portion of the produced cyanogen and all of the produced ammonia go into water solution in the reaction cell, and therefore a part of the liquid in the cell should be circulated to an exterior recovery and purification system to maintain the process continuous and stable. Any unreacted hydrogen cyanide dissolved in the water solution reacts with ammonia formed during the electrolysis in reaction vessel 1 to form water-soluble ammonium cyanide.

The aqueous electrolytic solution containing ammonium cyanide and cyanogen is withdrawn from the reaction cell through line 39 and is reacted therein with sulfuric acid entering line 39 from pump 41 and line 43. The reaction between sulfuric acid and the ammonium cyanide causes the formation of water-soluble ammonium sulfate and hydrogen cyanide. The reaction mixture is passed to heater 45 which raises the temperature of the mixture, accelerates the chemical reaction taking place, and transforms the mixture to gaseous state. From heater 45, the gaseous mixture passes through line 47 to fractionation tower 49 which is of a conventional type, such as a bubble-cap tray tower. The mixture enters the tower at a point near the bottom and rises upwardly therein. Gaseous cyanogen, together with some water vapor and hydrogen cyanide, passes out the top of the tower through line 51 and into vapor-liquid separator, where the water vapor and hydrogen cyanide condense out at below about 26° C., and are withdrawn through line 55 and returned to the upper portion of tower 49 for use as reflux. Uncondensed cyanogen passes out of separator 53 through line 57 to storage. Condensed water vapor with ammonium sulfate dissolved therein is removed from the bottom of tower 49 through line 59, while liquid hydrogen cyanide condensing out on the tower trays is passed from the tower through line 61 and pump 63 to line 7 for re-entry to reaction vessel 1.

The above-described process conforms to a continuous type of operation where hydrogen cyanide is continuously introduced to the reaction vessel, sulfuric acid is continuously introduced to line 39 and cyanogen is continuously recovered. This process also may be operated on a once-through basis by the elimination of vapor purification and hydrogen cyanide recirculation, but such operation is generally uneconomical.

My invention is further illustrated by the following examples:

Example I

A solution of 20 cc. of hydrogen cyanide in 60 cc. of distilled water was electrolyzed using a platinum-wire-screen anode and carbon-rod cathode at 0° C. with an E. M. F. between electrodes of 10 volts, a distance of $\frac{3}{32}$" between electrodes, and a current of 0.70 amp. The electrolysis was conducted for 7 hours in a tube immersed in an ice bath. Unreacted hydrogen cyanide recovered from the effluent was recycled to the reaction mixture. Product gas samples, taken after the process had been in operation for about two hours, were analyzed by means of a mass spectrometer, the composition so determined being as follows:

|   | Composition (mol. percent) | Composition (mol. percent) after removal of air, HCN and $H_2O$ |
|---|---|---|
| $(CN)_2$ | 0.5 | 0.7 |
| $H_2$ | 50.6 | 68.6 |
| HCN | 18.0 | 0.0 |
| $O_2$ | 8.7 | 9.6 |
| $N_2$* | 5.9 | 0.0 |
| $CO_2$ | 9.6 | 13.0 |
| CO | 6.0 | 8.1 |
| $H_2O$ | 0.7 | 0.0 |
|   | 100.0 | 100.0 |

*From air.
Average calculated conversion of HCN to $(CN)_2$ (based on $H_2$ production, corrected for electrolysis of $H_2O$ and production of $CO_2$)$^2$=68.3 mol. percent.

Example II

A solution of 20 cc. of freshly distilled hydrogen cyanide in 60 cc. of water was electrolyzed at 0° C., using a platinum-wire-screen anode and a carbon-rod cathode, an E. M. F. between electrodes of 11 volts, a current of 0.25 ampere, and a distance of $\frac{3}{32}$" between electrodes. Condensed water and hydrogen cyanide were recycled. A product gas sample, taken after about 4 hours of operation, was analyzed with a mass spectrometer. Composition of the gas was as follows:

|   | Composition (in mol. percent) | Composition (mol. percent) after removal of air, $H_2O$ and unreacted HCN |
|---|---|---|
| $(CN)_2$ | 0.6 | 1.2 |
| $H_2$ | 30.3 | 62.3 |
| HCN | 18.6 | 0.0 |
| $O_2$ | 12.3 | 11.4 |
| $N_2$* | 25.7 | 0.0 |
| $CO_2$ | 7.2 | 14.8 |
| $H_2O$ | 0.3 | 0.0 |
| CO | 5.0 | 10.3 |
|   | 100.0 | 100.0 |

*From air.
Calculated ultimate yield of $(CN)_2$ (based on amount of HCN reacting) = 66.4 mol. percent.

Example III

The same conditions were followed as in Example II, except that the carbon electrode was replaced with a platinum electrode. After 2 hours as determined by mass spectrometric analysis the gas composition was as follows:

|   | Actual (in mol. percent) |
|---|---|
| $(CN)_2$ | 0.04 |
| $H_2$ | 31.4 |
| HCN | 17.1 |
| $O_2$ | 8.3 |
| $N_2$ | 28.0 |
| $CO_2$ | 9.9 |
| CO | 5.3 |
|   | 100.04 |

Average calculated ultimate yield = 62.1 mol. percent of $(CN)_2$ (based on HCN reacting).

Example IV

A solution of 30 cc. (20.65 gm.) of hydrogen cyanide in 50 cc. of distilled water was electrolyzed in a reaction vessel using two platinum wire screens as electrodes. The screens were placed opposite and parallel and spaced $\frac{3}{8}$" apart so that gases evolving from each electrode swept both electrodes. An electromotive force of 15 volts was initially applied to the electrodes. The temperature rose to the boiling point of the solution and boiling and electrolysis occurred simultaneously. The voltage was then reduced to about 6.5 volts and a current of about 0.3 ampere maintained during the process. Evolved hydrogen cyanide, water, cyanogen, hydrogen, oxygen and carbon dioxide vapors were passed to a condenser operating at about 4° C., and condensed hydrogen cyanide and water were recycled therefrom to the reaction vessel, while uncondensed gases were passed to a recovery unit and the cyanogen separated out by condensation. Samples of the evolved gases were taken after 1 and 2 hours of continuous operation and subjected to analysis with a mass spectrometer, and a sample of liquid reaction mixture was taken at the end of 2 hours. The analytical results are as follows:

| Gas Analysis | Composition (mol. percent) | |
| --- | --- | --- |
| | after 1 hr. | after 2 hours |
| CO | | |
| $(CN)_2$ | 0.2 | 0.3 |
| $H_2$ | 12.6 | 19.7 |
| $CO_2$ | 2.1 | 3.4 |
| $O_2$ | 11.9 | 11.0 |
| $N_2$* | 36.4 | 27.1 |
| HCN | 35.9 | 37.9 |
| $H_2O$ | 0.9 | 0.6 |
| | 100.0 | 100.0 |

Liquid analysis, meq. $(CN)_2$/cc. reaction mixture, 0.2.**
*From air.
**Approximate value: Selectivity calculated as
$\frac{(CN)_2 \text{ produced}}{HCN \text{ consumed}} \times 100 = \frac{84.8\% \text{ (after 1 hr.)}}{86.3\% \text{ (after 2 hrs.)}}$
Yield $(CN)_2$ in gm. = 0.364 gm. = 2% conversion

Example V

A solution of 35 cc. (24.09 gm.) of hydrogen cyanide in 35 cc. of water was charged to the same reaction vessel as in Example IV and a power input of about 6.5 watts was maintained. More vigorous boiling than in Example IV was obtained. Gas and liquid analysis were as follows:

| Gas Analysis | Composition (mol. percent) | |
| --- | --- | --- |
| | after 1 hr. | after 2 hrs. |
| CO | | |
| $(CN)_2$ | 1.4 | 1.2 |
| $H_2$ | 31.7 | 43.3 |
| $CO_2$ | 4.8 | 6.7 |
| $O_2$ | 11.7 | 3.0 |
| $N_2$* | 22.9 | 6.5 |
| HCN | 26.8 | 38.7 |
| $H_2O$ | 0.7 | 0.6 |
| | 100.0 | 100.0 |

Yield $(CN)_2$ in gm. = 0.728 gm. = 3.1% conversion.
Liquid analysis, meq. $(CN)_2$/cc. reaction mixture, 0.4.**
*From air.
**Approximate value: Selectivity = 86.7% (after 1 hr.), 91.1% (after 2 hrs.). Cyanogen production per kilowatt hr. (after 2 hrs.), 0.32 lb.

It is to be understood that modifications and equivalents of the various steps and apparatus of my process such as are within the purview of one skilled in the art are contemplated by this invention.

I claim and particularly point out as my invention:

1. The process which consists in electrolytically dissociating liquid hydrogen cyanide into cyanogen and hydrogen by passage of an electric current therethrough, said electric current flowing between a metal electrode relatively resistant to oxidation and chemical corrosion and a second electrode selected from the group consisting of an attack-resistant metal, carbon, and graphite.

2. The process of claim 1 in which hydrogen cyanide is maintained at its boiling point during electrolysis.

3. The process of claim 1 in which hydrogen cyanide is electrolyzed in aqueous solution.

4. The process of claim 3 in which said aqueous solution is maintained at its boiling point during electrolysis.

5. The process which consists in the steps of admixing water and hydrogen cyanide, electrolyzing said admixture in a reaction zone between a metal electrode relatively resistant to oxidation and chemical corrosion and a second electrode selected from the group consisting of an attack-resistant metal, carbon, and graphite, condensing unreacted hydrogen cyanide and steam from the reaction effluent in a condensing zone, recycling said condensed aqueous hydrogen cyanide to said admixing step, recovering uncondensed product effluent from said condensing zone, and separating cyanogen therefrom.

6. The process of claim 5 in which said electrodes are platinum and carbon and in which said admixture is maintained at its boiling point during electrolysis.

7. The process of claim 5 in which at least a portion of said electrolyzed admixture is withdrawn to a separate treating zone, mixed with sulfuric acid and heated to a temperature sufficient to liberate cyanogen and hydrogen cyanide, fractionating the effluent vapors to separate gaseous cyanogen and liquid hydrogen cyanide and recycling the hydrogen cyanide to said reaction zone.

8. The process of claim 7 in which said admixture during electrolysis is maintained at its boiling point and in which the electrodes are platinum and carbon.

9. The continuous process which consists in initially admixing water and hydrogen cyanide, continuously electrolyzing said admixture in a reaction zone between a metal anode relatively resistant to oxidation and chemical corrosion and a cathode selected from the group consisting of an attack-resistant metal, carbon, and graphite, continuously condensing unreacted hydrogen cyanide and steam from the electrolysis reaction effluent in a condensing zone, continuously recycling said condensed aqueous hydrogen cyanide to said reaction zone, continuously recovering uncondensed product effluent from said condensing zone and separating cyanogen therefrom, and introducing make-up gaseous hydrogen cyanide to said reaction zone in quantity sufficient to maintain the concentration of aqueous hydrogen cyanide at a substantially constant level.

10. The process of claim 9 in which said anode is platinum and said cathode is carbon.

11. The process of claim 9 in which a portion of said electrolyzed admixture is continuously withdrawn from said reaction zone and mixed with separately introduced sulfuric acid, the reaction product is heated to a temperature sufficient to liberate cyanogen and hydrogen cyanide, the effluent vapors are passed from said treating zone to a separate fractionation zone and separated in said fractionation zone into gaseous cyanogen and liquid hydrogen cyanide, and the so-separated liquid hydrogen cyanide is recycled to said reaction zone as at least a portion of said make-up gaseous hydrogen cyanide.

12. The process of claim 11 in which said anode is platinum and said cathode is carbon.

13. The process which consists in dissolving hydrogen cyanide in water in a molar ratio of 1:2, introducing said solution into a reaction vessel between a platinum anode and carbon cathode set 1–8 thirty-seconds of an inch apart, while applying an E. M. F. of 10–40 volts across said electrodes, passing resulting reaction effluent through a condensing zone and condensing therein unreacted hydrogen cyanide and steam, returning said condensed mixture to said reaction vessel and continuing said electrolysis until substantially all said hydrogen cyanide has been electrolyzed, and separating cyanogen from uncondensable reaction effluent and from spent electrolyte.

14. Process in accordance with claim 1 in which the metal electrode is selected from the group consisting of platinum, nickel, gold and chrome alloy.

15. Process in accordance with claim 14 in which the attack-resisting metal is selected from the group consisting of platinum, gold, nickel and chrome alloy.

References Cited in the file of this patent

UNITED STATES PATENTS 775,597     Cassel     Nov. 22, 1904

FOREIGN PATENTS 2,660     Great Britain     of 1895